(12) United States Patent
Laljiani

(10) Patent No.: US 7,127,053 B1
(45) Date of Patent: Oct. 24, 2006

(54) CALL SCHEDULING ON A TELEPHONE NETWORK USING A TELEPHONY INTERFACE

(75) Inventor: Ghulam Abbas Laljiani, Lawrenceville, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 504 days.

(21) Appl. No.: 09/703,312

(22) Filed: Nov. 1, 2000

(51) Int. Cl.
*H04M 3/42* (2006.01)
*H04M 7/00* (2006.01)

(52) U.S. Cl. .................. 379/210.01; 379/207.03; 379/221.09; 379/221.11; 379/221.12

(58) Field of Classification Search .......... 379/210.01, 379/201.03, 202.01, 201.01, 201.02, 207.03, 379/221.08, 221.09, 221.11, 221.12, 266.07
See application file for complete search history.

(56) References Cited

U.S. PATENT DOCUMENTS

| | | | |
|---|---|---|---|
| 5,329,578 A * | 7/1994 | Brennan et al. | 379/211.03 |
| 5,701,301 A | 12/1997 | Weisser, Jr. | 370/428 |
| 5,802,157 A * | 9/1998 | Clarke et al. | 379/196 |
| 5,848,132 A * | 12/1998 | Morley et al. | 379/210.01 |
| 5,995,608 A * | 11/1999 | Detampel et al. | 379/205.01 |
| 6,005,845 A * | 12/1999 | Svennesson et al. | 370/260 |
| 6,052,440 A * | 4/2000 | Yuhn | 379/88.13 |
| 6,075,992 A * | 6/2000 | Moon et al. | 455/455 |
| 6,539,079 B1 * | 3/2003 | Crockett et al. | 379/88.12 |
| 6,674,851 B1 * | 1/2004 | Brush et al. | 379/221.08 |

* cited by examiner

*Primary Examiner*—Harry S. Hong
(74) *Attorney, Agent, or Firm*—Lee & Hayes, PLLC

(57) ABSTRACT

A system and method to allow telephone subscribers to schedule calls for future placement on a telephone network using a telephone interface. In an illustrative implementation, a telephone subscriber part of an AIN telephone network is offered a call scheduling service whereby the subscriber may schedule future placed calls according to various parameters (e.g. telephone number(s) to call, the time of the scheduled call, and the frequency of the call, i.e. every day, month, week, or year) by inputting parameters using a telephone interface of a telephone station that is connected to the AIN telephone network. In operation, a participating user would connect to the service switch point (SSP) of the AIN telephone network using his/her telephone station. The SSP communicates this request to a service control point (SCP) having an administrative application and a call scheduling application. The SCP verifies that the requesting party is a subscriber to the call scheduling service and cooperates with a service node (SN) to prompt the participating user to input information indicative of the desired scheduled calls. The call schedule information is stored in a SCP cooperating database. When the scheduled time for a scheduled call arrives, the SCP cooperates with the SN to notify the participating user (e.g. by calling the subscriber's listed telephone) that the time for the scheduled call has arrived. If prompted by the participating user, the SCP proceeds to cooperate with the SN to place the scheduled call.

31 Claims, 4 Drawing Sheets

CALL SCHEDULING ON A TELEPHONE NETWORK USING A TELEPHONY INTERFACE

CROSS-REFERENCE

This application cross-references U.S. patent application Ser. No. 09/873,709, entitled, "SYSTEMS AND MEHTODS FOR SETTING FUTURE TELECONFERENCE CALLS", filed on Jun. 4, 2001.

FIELD OF THE INVENTION

The present invention generally relates to the field of telecommunications and to an apparatus and method for scheduling calls. More particularly, the present invention relates to an intelligent or advanced application, such as an Advanced Intelligent Network (AIN) application, for call scheduling within a telephone network.

BACKGROUND OF THE INVENTION

In conventional telephone networks, parties place telephone calls on a regular basis, often, according to a predefined or predetermined schedule. In such cases, the party placing these repetitive calls is relegated to keeping an independent schedule to remind him/herself to place the calls and, moreover has to physically place the call at the scheduled time. As such, the calling party expends valuable time and resources in tracking and performing these scheduled calls. The burden of maintaining and following schedule can lead to missed calls that can spell disaster in certain critical situations. Moreover, tracking, scheduling, and placing these periodic and important phone calls takes up the party's time which could otherwise be used for other purposes.

In recent years, a number of new telephone service features have been provided by an AIN. The AIN evolved out of a need to increase the capabilities of the telephone network architecture in order to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

While the AIN architecture has been used to provide numerous services to telephone customers, there is presently no telephone system that allows parties to schedule phone calls with the telephone network such that the party may schedule a call by inputting the date and time of the call with the telephone network in advance, whereby the telephone network and the telephone network may remind the party of the schedule and place the call according to the inputted call information.

From the foregoing it is appreciated that there exists a need for a system and methods to allow parties to schedule telephone calls using a telephone interface. By having this ability, the drawbacks of the prior art are overcome.

SUMMARY OF THE PRESENT INVENTION

A system and methods to schedule calls with a telephone network using a telephone interface is provided. In an illustrative implementation, the system of the present invention comprises a first telephone station indicative of the party scheduling the calls that is coupled to an advanced intelligent network (AIN). The first telephone station is used to input call schedule information for desired scheduled calls to be placed to other telephone stations or other terminating devices of an AIN. The call schedule information, indicative of future scheduled calls to the AIN, is processed and stored by the AIN such that scheduled calls are placed in accordance with the stored call schedule information.

In operation, a participating user (i.e. a user subscribed to the call scheduling service (CSS)) inputs call schedule information (e.g. date, time, and scheduled party information) to an AIN, using a telephone interface coupled to an AIN. The call schedule information is first processed by the service switching point (SSP) that passes the information to a call scheduling service (CSS) service package application (SPA) operating on the AIN service control point (SCP). In turn, the CSS SPA processes the call schedule information to create a record that indicates to the AIN to call the scheduled party at a specified time and date. The record is stored by the CSS SPA on a cooperating SCP database. At the specified time and date of the scheduled call, the SCP SPA retrieves the created record and communicate to an AIN service node (SN) to place a confirmation call to the participating user (i.e. call scheduling party) to confirm that the scheduled call should still be placed. Upon confirmation, the SN will calls the scheduled party (i.e. intended number to be called). Alternatively, the SCP SPA will not request the SN to place the call if confirmation by the scheduling party is not received or if the scheduling party decides to cancel the scheduled call.

The above-listed features of the present invention, and others, will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE ILLUSTRATIVE IMPLEMENTATION

AIN Overview:

According to an aspect of the present invention, an apparatus and method providing a call scheduling service may be implemented using an advanced intelligent network (AIN) or AIN-type network. AIN systems are described in U.S. Pat. No. 5,701,301, which is incorporated herein by reference in its entirety. In particular, an AIN network with at least AIN Release 0.2 and advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Figure 1:
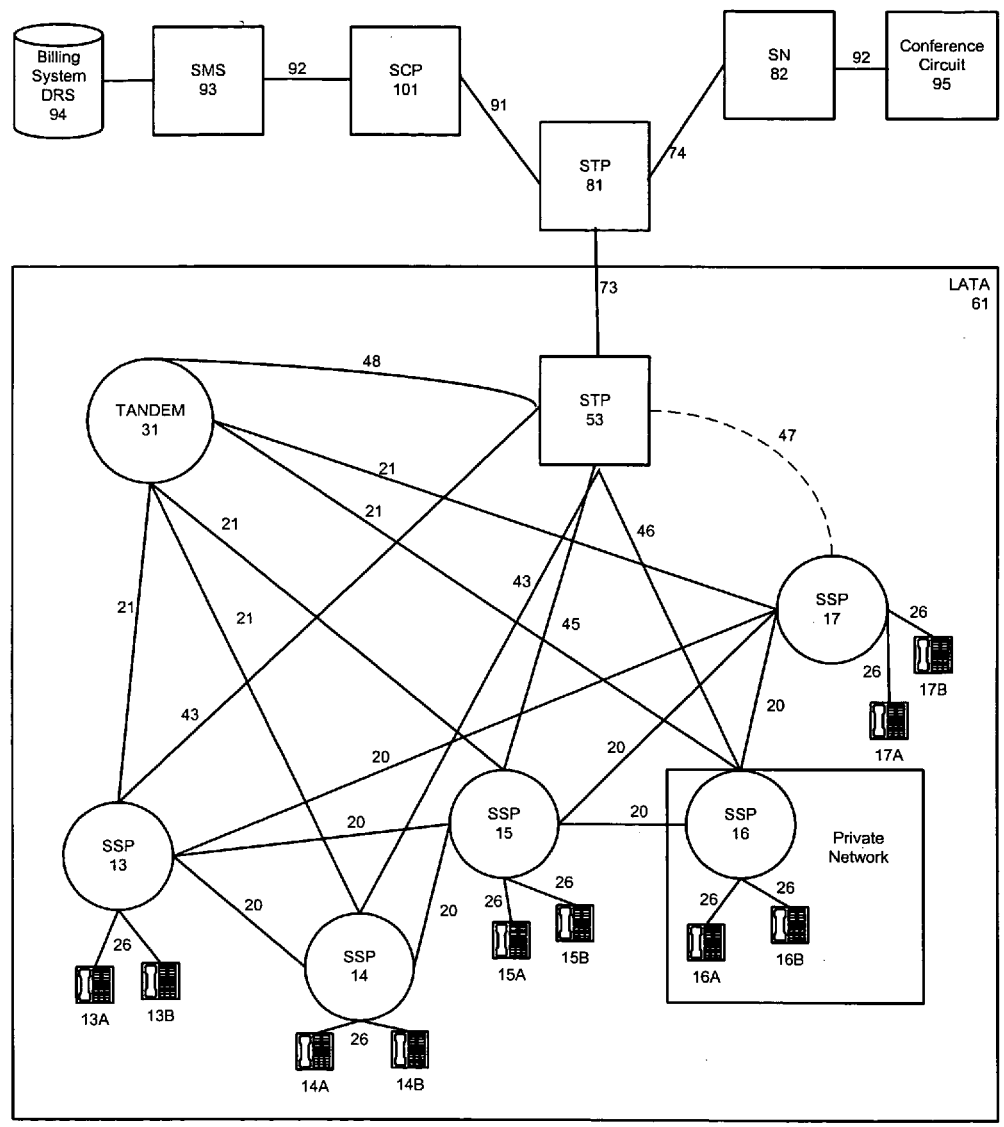
FIG. 1 is a general block diagram form showing an Advanced Intelligent Network (AIN)-based system for implementing intelligent network management features, in accordance with an embodiment of the present invention.

Referring now to the accompanying drawings, FIG. 1 illustrates an AIN-based network arrangement incorporating the various features of the invention, as further described below. In the embodiment of FIG. 1, a telephone network within local access and transport area (LATA) 61 is provided that defines a calling service area. LATA 61 includes stations, e.g., stations 13A, 13B, 14A, 14B, 15A, 15B, 16A, 16B, 17A and 17B, and corresponding switches, e.g., service switching points (SSP) (also known as central offices (CO)) 13, 14, 15, 16 and 17. COs 13, 14, 15, 16 and 17 may comprise, for example, 1AESS or 5ESS switches. These switches may be manufactured by, for example, Lucent Technologies, Inc., having AIN Release 0.2 capabilities and protocols, or DMS-100 switches manufactured by, for example, Nortel having AIN Release 0.2 capabilities and protocols, or in the case of the 1AESS, additionally having AIN Release 0.0 and AIN Release 0.1 capabilities and protocols. Additionally, it may be possible for the DMS-100 and 5ESS switches to have AIN release 0.0 and AIN Release 0.1 capabilities and protocols. Further, in accordance with an aspect of the present invention, as new AIN Releases and protocols (e.g., AIN Release 0.3) are introduced, the capabilities of the SSPs and the service logic of the present invention may be upgraded accordingly.

In the example shown in FIG. 1, each switch may include different types of facilities and/or triggers. SSPs 13–17 are each programmable switches which: recognize AIN-type calls, launch queries to service control point (SCP) 101, and receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

As further shown in FIG. 1, either a direct route or a tandem route may exist between all switches. In LATA 61, direct trunks 20 may exist between SSP 13, SSP 14, SSP 15, SSP 16 and SSP 17. Assuming LATA 61 to be a large service area, direct trunks 20 may not be available between each switch, either due to geographical limitations or due to excessive traffic. For example, SSP 13 may alternatively use tandem trunk 21 to a tandem switch 31 and may use trunk 21 to SSP 17 to terminate an offered call. This alternative path may be an overflow route for traffic that cannot find room on trunk 20 between SSP 13 and SSP 17. Trunks 21 and 22 may be either SS7 controlled multi-frequency trunks (MF), or primary rate interface (PRI) trunks. The type of trunk will be in accordance with both the sending and receiving SSP to which it is connected. If either of the SSPs is a 1AESS type switch, the trunk will be an SS7 controlled MF type trunk as the 1AESS is not capable of supporting PRI trunks. However, if both the sending and receiving switches are either a DMS-100 switch or a 5ESS switch, the trunk may be either an SS7 controlled MF type trunk or PRI type trunk.

Each office equipped as an AIN SSP may allow normal switch processing to be suspended at specific points in a call so that the switch may send an AIN message query to SCP 101. Alternatively, SCP 101 may comprise an integrated service control point (ISCP). Service control point 101 may execute software based service logic and return call processing instructions to the triggering AIN SSP. New services may be provisioned by assigning AIN SSP triggers to customer lines, trunks, and/or NANP telephone numbers.

As described above, within LATA 61 is a tandem switch 31 that is connected to SSPs 13–17. Tandem switch 31 is coupled to SSPs 13–17 of LATA 61 by trunks 21. Trunks 21 may interconnect tandem switch 31 with each SSP within LATA 61 for routing of telephone calls. However, trunks 21 may also be used to connect tandem switch 31 to, e.g., toll calls that terminate on SSPs (not shown) outside LATA 61; and, calls originating outside of LATA 61 but terminating on an SSP within LATA 61.

As noted above, the SCP 101 may comprise an integrated service control point (ISCP). The ISCP is an integrated system which may include a service management system (SMS 93), a data and reports system (DRS 94), a programmable service control point (SCP), and a service creation environment (SCE). The SCE may be provisioned as a terminal implemented to work with SMS to create, modify, and load services into the SCP database. The SCE may comprise, for example, a programming environment (such as the SPACE$^{SM}$) for creating and provisioning services. The SCP may execute software-based service logic and return call routing instructions to the triggering SSPs. SMS 93 may be provided for administrative purposes to synchronize customer CPR and data on the mated pair of ISCPs that SCP 101 represents. The DRS 94 may be provided for compiling call information to be used for billing and administrative purposes. A service node (SN) 82 is an interactive data system that acts as a switch to transfer calls. SN 82 may be a Lucent Technologies Star Server FT Model 3200 or Model 3300, although others may be employed without departing from the scope of the invention. SN 82 provides interactive help, collects voice information from participants in a call, may track calls within a conference circuit 95, and provides notification functions. Conference circuit 95 includes a plurality of ports that are used to connect all parties to a conference call. Conference circuit 95 reserves ports and numbers, as necessary, in order to connect the participants of a particular conference call, as will be described in further detail below.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 43, 44, 45, 46, 47, 48, 73 and 91 between each SSP and tandem switch 31 and SCP 101. The data messages may be formatted in accordance with the Transaction Capabilities Applications Part (TCAP). Alternatively, ISDN Users Part (ISUP) may be used for signaling purposes between, for example, SSPs 13–17. In such a case, the SSPs may be equipped with the capability to map appropriate data between TCAP and ISUP protocols, and vice versa. The telephone network employs an upper-level software controlled network through the Signaling Transfer Points (STPs) and the SCP (and/or ISCP). The software presides over the hardware to check the call route and the availability of connection prior to hardware connection.

Accordingly, the connections by links 43–48, link 73, and link 91 through STPs 53 and 81 are for signaling purposes and allow SSPs 13–17 to send and receive messages to and from SCP 101 via the STPs. As shown for example in FIG. 1, a local STP 53 may act as the data messaging control point for LATA 61. That is, all data messages from SSPs within LATA 61 or directed to SSPs within LATA 61 may be transmitted through STP 53. Accordingly, CCS links 43–48 are shown establishing a data link between STP 53 and either tandem switch 31, SSP 13, SSP 14, SSP 15, SSP 16 or SSP 17. Further, one or more regional STPs may be provided for data messaging with the LATA. In FIG. 1, regional STP 81 is illustrated as receiving and transmitting data messages with LATA 61 by connecting to STP 53 by line 73 and connecting to SCP 101 by link 91.

For purposes of illustration, various features of the present invention will now be described from the standpoint of a switch implementing AIN Release 0.2 protocols, and the CPR provisioned with TAT, 10D or DLN triggers. However, as will be apparent to those of ordinary skill in the art based on the disclosure provided herein, the present invention is not limited to implementation through AIN Release 0.2 and may be designed and provisioned with a network utilizing triggers associated with future AIN releases and trigger types.

Figure 2:
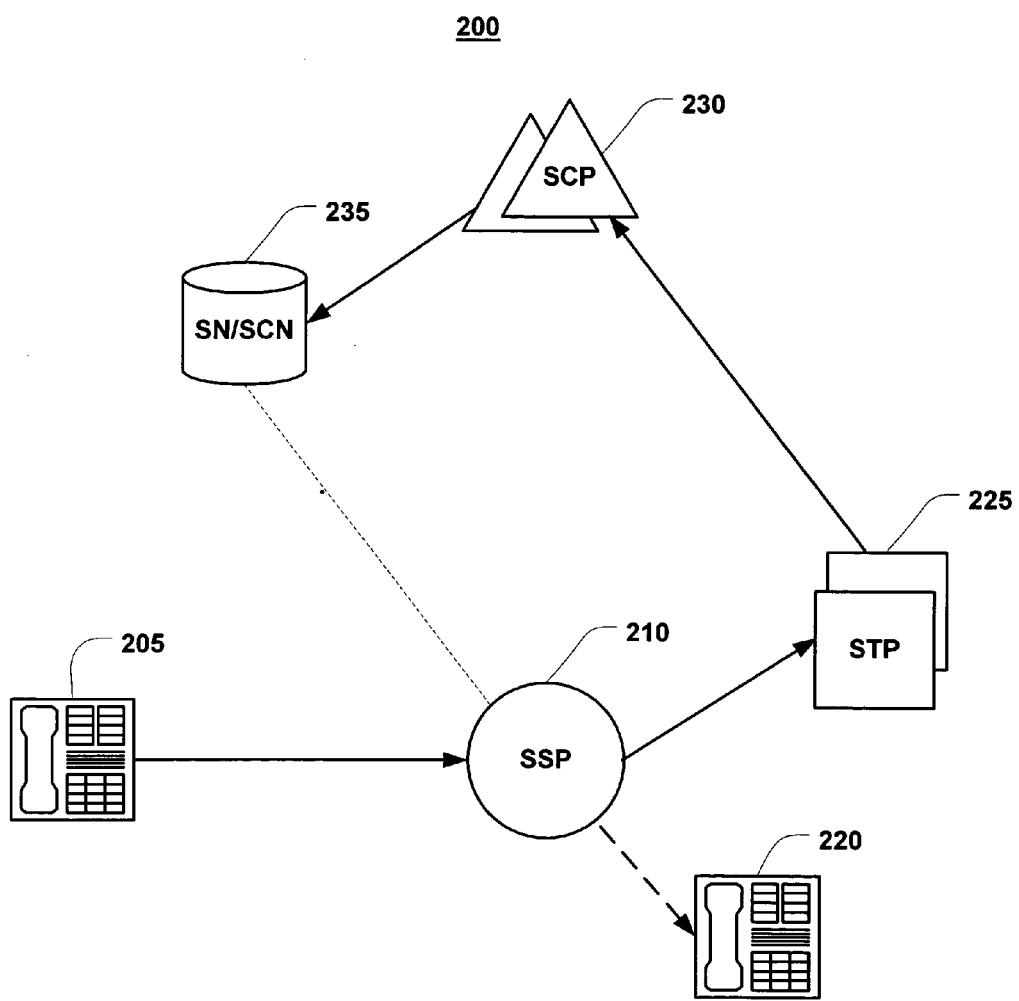
FIG. 2 is a block diagram, illustrating in more detail, elements of a call scheduling system in accordance with the present invention.

The present invention provides a system within the AIN or AIN-type environment providing a call scheduling service. In accordance with the invention, when the call schedule service (described below) is activated for a given party (e.g. a party at telephone interface device 205 of FIG. 2), the party is able to schedule calls such that a call is placed to a desired target party at telephone station (e.g. telephone station 215 or 220) on a particular date and time in accordance with call schedule information inputted by the calling party.

As noted above, the call flow logic of the present invention is designed to operate with AIN Release 0.2 protocols. Furthermore, the call flow logic is designed to operate in a system employing out of band signaling, for example SS7, to facilitate call flow. In out of band signaling systems, in addition to supporting routing of calls, signaling information is used to provide caller privacy. Specifically, each scheduled call might have associated with it signaling information with the following attributes: a call schedule service identifier ("CSSI") which identifies the telephone interface that is being used to schedule the calls; an originally called number ("OCN") which identifies the phone number for scheduling; a PRI associated with the OCN to indicate whether the OCN is to remain private; a call scheduling service identifier ("CSSI") which identifies to the AIN that computing device associated with the scheduling party is subscribed to the call scheduling service.

According to one aspect of the invention, a system for providing call scheduling services within the AIN or AIN-type environment is provided. The call scheduling service allows participating subscribers the ability to schedule calls according to various parameters, such as, telephone number (s) to call, the time of the scheduled call, and the frequency of the call, by inputting parameters using a telephone interface that is connected to the AIN telephone network. In a preferred embodiment of the present invention, call schedule information is inputted at telephone station 205 of FIG. 2. As shown, telephone station 205 is electronically coupled to service switching point 210. Telephone station 205 maintains a telephone interface (not shown) that is used to input call schedule information. The implementation of a telephone interface that accepts call scheduling information and transmits it to the AIN will be apparent to those of skill in the art, and thus the hardware and software to implement such an interface on a telephone station are not provided herein.

In operation, telephone station 205 provides call schedule information to SSP 210. Included in the call schedule information is: 1) the time of the scheduled call, 2) the numbers to be called, and 3) the number to call as part of the confirmation process. The call schedule information is communicated to SSP 210 where it is passed to SCP 230 through STP 225. The information is processed by SCP 230 for future use. Included in the processing performed by SCP 230 are the steps of: parsing the call schedule information and storing the call schedule information into pre-defined fields of a cooperating call schedule information database (not shown) When the scheduled time for the call arrives, SCP 230 communicates with SN/SCN 235 to place a confirmation call to the confirmation number. Depending on the results of the confirmation call, SCP 230 will proceed to either place the scheduled call to the target number (i.e. inputted number of the call schedule information) or cancel the placement of the scheduled call. That is, if the call to the confirmation number results in no answer or is picked up by an answering service (e.g. voice-mail and/or answering machine), the scheduled call is not placed. Moreover, if the confirmation call to the confirmation number is answered and the confirmation party decides to cancel the scheduled call, the scheduled call is no placed. Alternatively, if confirmation is received, the SCP 230 places the scheduled call using SN/SCN 235 employing the stored call information.

Figure 3:
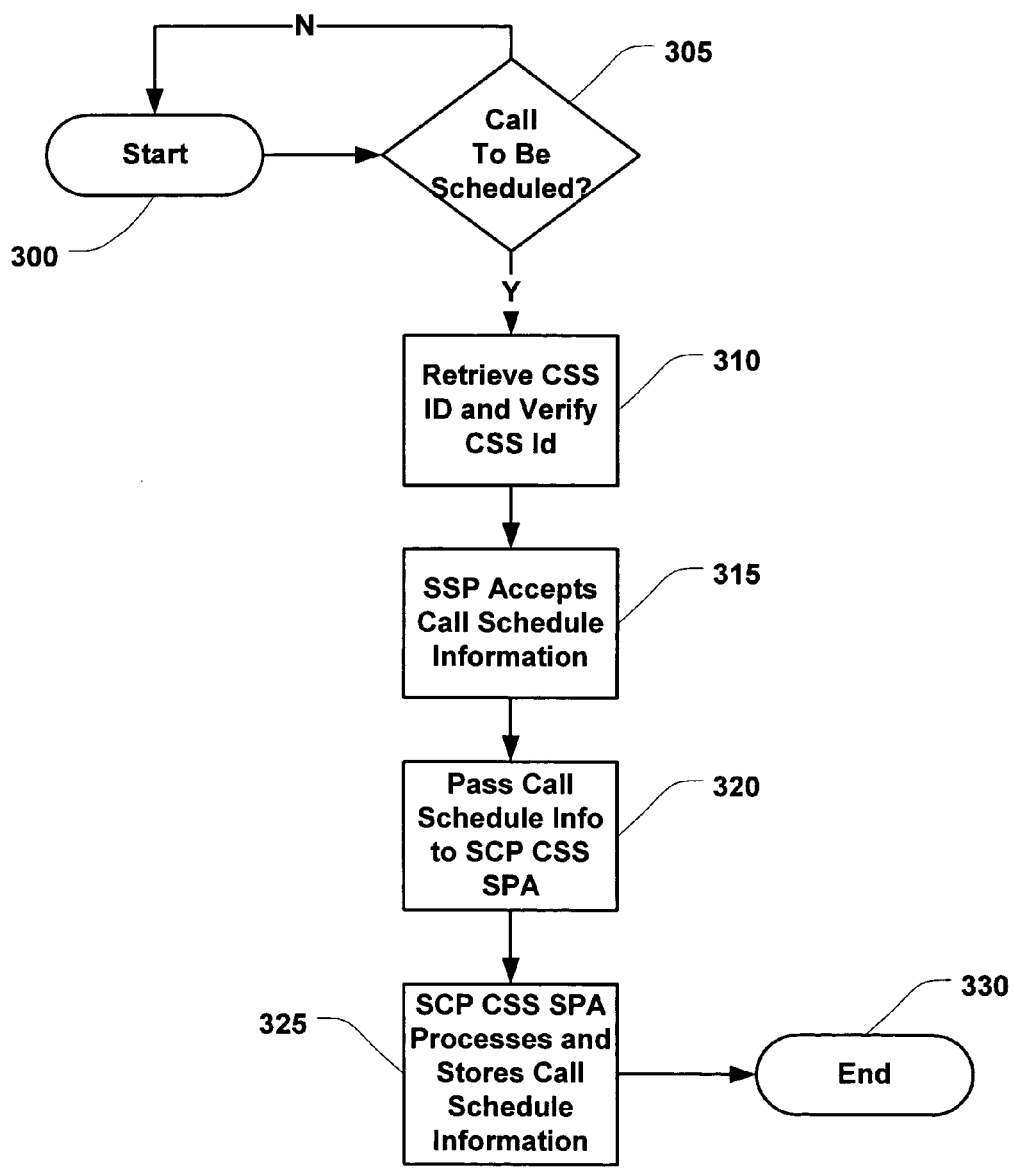
FIG. 3 is flowchart describing the processing that is performed when scheduling calls with a call scheduling system in accordance with the present invention.

FIG. 3 shows the processing that is performed by the present invention when accepting call scheduling information. Processing begins at block 300 and proceeds to block 305 where a check is performed to determine if a call has been scheduled. Call scheduling information may be received at block 305 from telephone interface (not shown) of telephone station 205 of FIG. 2. If call scheduling information is not received, then processing loops back to block 300 to wait for call scheduling information to be entered. However, if the alternative proves to be true, processing proceeds to block 310 where the call schedule service identifier (CSSI) is received by the SSP and passed along to the SCP SPA where it is verified to ensure that the submitted scheduled call is being submitted by a telephone interface authorized to schedule calls. If the telephone interface is authorized to schedule calls with the call scheduling service, the SSP accepts information from telephone interface indicative of calls to be scheduled at block 315. The call schedule information preferably includes 1) the time and date of the scheduled call, 2) the number or numbers to be called at the specified time and date, and 3) the confirmation number to call prior to placing the scheduled call. At block 320, the call schedule information is passed to the SCP SPA and is processed and stored for future placement at block 325. Processing then terminates at block 330.

Figure 4:
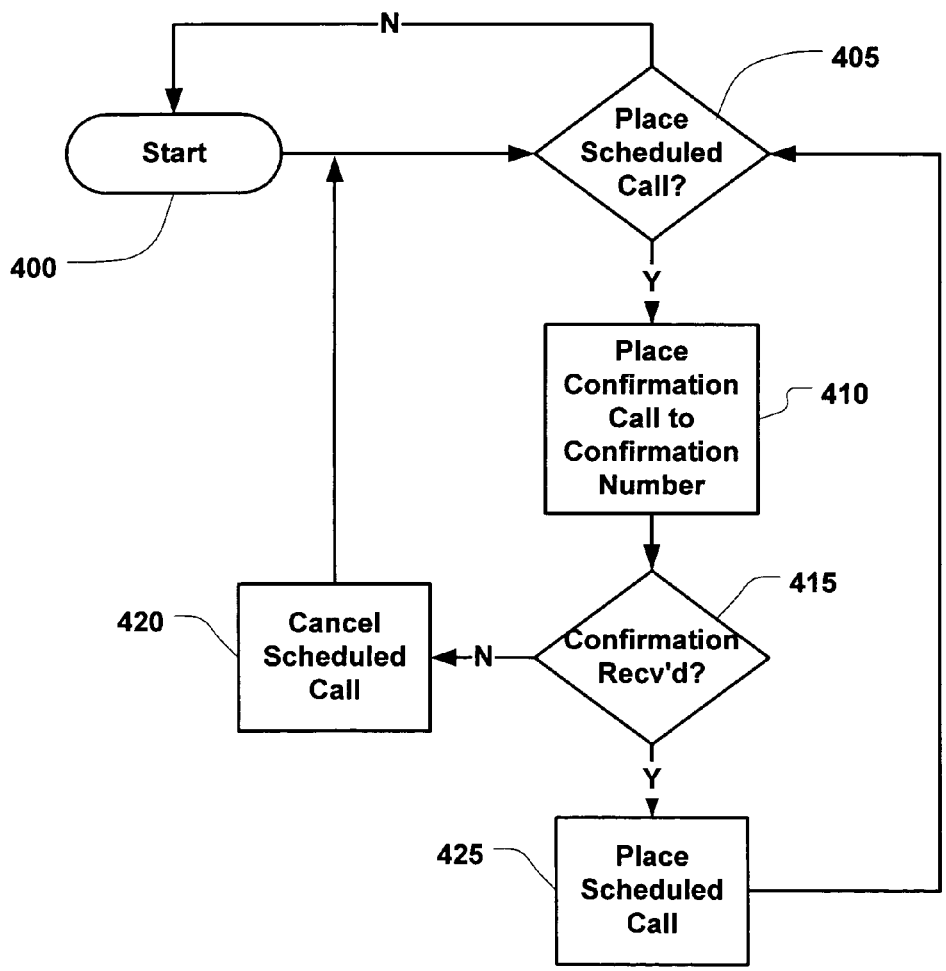
FIG. 4 is a flowchart describing the processing performed when placing a scheduled call by a call scheduling system in accordance with the present invention.

FIG. 4 is a flowchart of the processing performed when placing scheduled calls. Processing starts at block 400 and proceeds to block 405 where a check is performed by the SCP call scheduling service (CSS) SPA to determine if it is time to place a scheduled call. This may be performed by comparing the present time (e.g. on a clock maintained by the SCP CSS SPA) with a list of times for scheduled calls. If there are no scheduled calls, processing reverts to block 400 to wait for a time at which a call has been scheduled. If it is time to place a scheduled call, the SCP CSS SPA, using the SN/SCN, places a confirmation call to the confirmation number associated with the scheduled call at block 410. A check is then made to see if confirmation is received at block 415. If confirmation is received at block 415, the scheduled call is placed at block 425. If, however, confirmation is not received or if the scheduling party indicates that he or she no longer wishes to place the scheduled call, processing proceeds to block 420 where the scheduled call is cancelled. Processing reverts to block 405 and proceeds therefrom.

As described above, the present invention provides a system for call scheduling services using a telephone interface. The system allows persons that have subscribed to this service to schedule calls that are placed by the cooperating telephone network according to inputted dates and time, inputted using a telephone interface that is electronically coupled to the telephone network. Thus, the system frees persons from having to keep tracks of scheduled calls. Users of a system in accordance with the invention, therefore, can redirect the valuable resources devoted to call scheduling to other activities while the system keeps track of and places scheduled calls. In this way, a system in accordance with the present invention provides the potential to increase worker productivity and avoid missing the placement of what may be mission critical calls.

It is noted that the written description provided herein contains acronyms which refer to various communication services and system components. For purposes of the written description herein, acronyms will be defined as follows:

10D—10 Digit Trigger

AIN—Advanced Intelligent Network

CCIS—Common Channel Interoffice Signaling

CCS—Common Channel Signaling

CO—Central Office

CPR—Call Processing Record

CPN—Calling Party Number

DLN—Dialed Line Number

DRS—Data and Reports System

EO—End Office

ISCP—Integrated Service Control Point

ISUP—ISDN Users Part

LATA—Local Access and Transport Area

MF—Multi-Frequency

NANP—North American Numbering Plan

NPA—Numbering Plan Area

NXX—Central Office Code

PRI—Primary Rate Interface

PSTN—Public Switched Telephone Network

SCE—Service Creation Environment

SCP—Service Control PointSMS—Service Management System

SS7—Signaling System 7

SSP—Service Switching Point

STP—Signaling Transfer Point

TAT—Termination Attempt Trigger

TCAP—Transaction Capabilities Applications Part

TG—Trunk Group

TN—Telephone Number

It is noted that the foregoing examples have been provided merely for the purpose of explanation and are in no way to be construed as limiting of the present invention.

While the invention has been described with reference to preferred embodiments and illustrative implementations, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system to schedule placement of outgoing calls comprising:

a service switching point (SSP) that is adapted to communicate with a first telephone station associated with a scheduling party that is scheduling the outgoing calls, and to communicate with at least one other telephone station associated with at least one scheduled party to receive the outgoing calls from the first telephone station, wherein said first telephone station is adapted to receive call schedule information on a telephone interface and to communicate said call schedule information to said service switching point (SSP);

a service node (SN) that is adapted to communicate with the service switching point (SSP), wherein said service node (SN) is further adapted to place the outgoing call to at least one other telephone station from the first telephone station in accordance with said call schedule information; and a service control point (SCP) adapted to communicate with said service switching point (SSP), and comprising: an administrative computing application, a call scheduling application, and a call information database, said service control point (SCP) configured to identify said service node (SN) as adapted to place the outgoing call to the other telephone station from the first telephone station in accordance with said call schedule information, wherein said service control point (SCP) and said service node (SN) are configured to place a confirmation call to an alternate telephone station specified by said scheduling party.

2. The system of claim 1, wherein said service switching point (SSP), upon receipt of a request from said first telephone station to schedule a call, is adapted to send a request to said service control point (SCP) to execute said administrative computing application and said call scheduling application, wherein said administrative computing application is adapted to determine if said first telephone station is allowed to schedule calls, and wherein said call scheduling application, upon confirmation that said first telephone station is allowed to schedule calls, is adapted to cooperate with said service switching point (SSP) SSP to accept, store and manage call scheduling data.

3. The system of claim 2, wherein said service switching point (SSP), upon receipt of a request from said service control point (SCP), is adapted to communicate a request from said service control point (SCP) to identify service nodes (SN) that may be used to communicate with said first telephone station, wherein said service switching point (SSP) is further adapted to cooperate with said identified service nodes (SN) to prompt said first telephone station to cause input of call schedule information indicative of desired scheduled calls.

4. The system recited in of claim 3, wherein said prompts comprise information representative of: a request to enter the time of the said scheduled call, a request to enter the frequency of the said scheduled call, and a request to enter the telephone number of the said scheduled call, and a request to enter the telephone number of said confirmation call.

5. The system recited in of claim 2, wherein said call schedule application of said service control point (SCP) is adapted to create a record for each scheduled call and to store said record in said call information database.

6. The system of claim 2, wherein said request from said first telephone station includes information identifying at least the subscriber to the call scheduling service.

7. The system of claim 2, wherein said service switching point (SSP) is adapted to launch a trigger application in response to the request from said first telephone station, and wherein said trigger application is adapted to generate the request to the said service control point (SCP).

8. The system of claim 2, wherein the request to the service control point (SCP) from the service switching point (SSP) comprises information identifying a telephone station associated with said scheduling party to call at the time of a scheduled call.

9. The system of claim 2, wherein said service control point (SCP), in response to the request from the said service switching point (SSP), is configured to search a database for information identifying service nodes (SN) that are adapted to place calls to said scheduling party and to said scheduled party.

10. The system of claim 2, wherein said call schedule application of said service control point (SCP) is adapted to monitor the time for scheduled calls, wherein said call schedule application, upon reaching the time for a scheduled call, is adapted to communicate to said service switching point (SSP) information representative of said scheduled call, the information comprising identified service nodes (SN) that may be used to complete the scheduled call and a request to place a confirmation call to the scheduling party, and wherein said service switching point (SSP) is adapted to communicate with least one of said service nodes (SN) a request to place said confirmation call.

11. The system of claim 10, wherein said service node (SN), in response to the request from the service switching point (SSP), is adapted to place said confirmation call to the other telephone station indicative of said scheduling party.

12. The system recited in claim 11, wherein said service control point (SCP) is adapted to, upon receiving confirmation for said scheduled call, instruct said service switch point (SSP) to place said scheduled call to said scheduled party using said identified service node (SN).

13. The system recited in claim 11, wherein said call schedule application of said service control point (SCP) is adapted to, upon not receiving confirmation for said scheduled call, delete the created record for the scheduled call.

14. The system of claim 1, wherein the connection between said service switching point (SSP) and said at least one other telephone station comprises a second service switching point (SSP).

15. In an advanced intelligent network (AIN) comprising a service switching point (SSP) connected to a first telephone station from which outgoing calls are to be placed, a plurality of service nodes (SN) each having interactive data systems, a service control point (SCP) containing a database, and at least one telephone station, a method of call scheduling from a first telephone station to schedule the outgoing calls to at least one other telephone station to which the outgoing calls are to be placed, comprising at least the following:

(a) at the service switching point (SSP), accepting call schedule information from said first telephone station, wherein said call schedule information contains data representing a time for the scheduled outgoing call, a date for the scheduled outgoing call, a telephone number for the scheduled outgoing call, a telephone number for the confirmation call as specified by a scheduling party, and outgoing calls scheduled from said first telephone station, wherein said service switching point (SSP) is adapted to communicate said call schedule information to said service control point (SCP);

(b) processing said call schedule information by said service control point (SCP) to ascertain the parameters for the scheduled outgoing call, (c) storing said call schedule information by said service control point (SCP) in a cooperating SCP service control point (SCP) call schedule information database;

(d) monitoring said stored call schedule information by said service control point (SCP) to determine if a scheduled outgoing call is to be placed; and (e) upon the scheduled time for a said scheduled call, placing said confirmation call to the designated telephone number as specified by the scheduling party by said service control point (SCP), wherein said service control point (SCP) is adapted to communicate with said service switching point (SSP) to place said confirmation call to the designated telephone number as specified by the scheduling party, wherein said service switching point (SSP) is adapted to communicate a request to said service control point (SCP) to identify cooperating service nodes (SN) to assist in placing said confirmation call, and wherein said service switching point (SSP) is adapted to cooperate with said identified service nodes (SN) to place said confirmation call; and (f) upon the acknowledgment of said confirmation call by the scheduling party, placing said scheduled call by said service control point (SCP), wherein said service control point (SCP) is adapted to communicate with said service switching point (SSP) to place the call according to said stored call schedule information, wherein said service control switching point (SSP) is adapted to communicate a request to said service control point (SCP) to identify cooperating service nodes (SN) to assist in placing the scheduled call, and wherein said service control switching point (SSP) is adapted to cooperate with said identified service nodes (SN) to place the scheduled call.

16. The method of claim 15, wherein said confirmation call comprises at least one of: a DTMF code and an electronic message.

17. The method of claim 15, further comprising, in response to receiving call schedule information from said first telephone station, launching a trigger at the service switching point (SSP), said trigger acting to notify said service control point (SCP) that a call is to be scheduled.

18. The method of claim 15, further comprising identifying to said service switching point (SSP) a plurality of cooperating service nodes (SN) for use when processing scheduled calls.

19. The method of claim 18, wherein identifying to the service switching point (SSP) the plurality of cooperating service nodes (SN), comprises transmitting the directory numbers corresponding to the plurality of service nodes (SN) by said service control point (SCP).

20. A method of completing outgoing telephone calls comprising at least the following:
 (a) receiving from a first party information indicative of an outgoing call to be scheduled, said information comprising a first telephone number associated with a telephone station to be called, a time to call said telephone station, and a second telephone number to which a confirmation call should be placed, wherein the second telephone number is specified by the first party;
 (b) storing the received information;
 (c) waiting until said time arrives;
 (d) placing said confirmation call to said first party using the second telephone number as specified by the first party;
 (e) transmitting, to said first party over said confirmation call, an inquiry as to whether said first party should be connected to said telephone station;
 (f) receiving a response from said first party indicating that said first party should be connected to said telephone station; and
 (g) connecting said first party to said telephone station.

21. The method of claim 20, wherein said information is received from a telephone interface of a telephone station.

22. The method of claim 20, wherein said information further indicates a date.

23. A system of connecting a scheduled outgoing telephone call using an automated telephone network, the system comprising:
 a telephone station for receiving call scheduling information as input by the scheduling party, wherein the call scheduling information includes at least data representing a telephone station to which a confirmation call related to the outgoing telephone call is to be placed;
 a service control point (SCP) in communication with said telephone station, said service control point (SCP) for storing said call schedule information, and wherein said SCP and a service node (SN) are adapted to place the confirmation call to the telephone station, wherein the telephone station to which the confirmation call is to be placed is identified by said scheduling party;
 a service switching point (SSP) adapted to communicate with said service control point (SCP), with said telephone station associated with said scheduling party, and with a telephone station associated with the party to be called, wherein said service switching point (SSP) is adapted to place the outgoing telephone call from said scheduling party to said party to be called in response to a request from said service control point (SCP).

24. The system of claim 23, wherein said service control point (SCP) and said service node (SN) are adapted to place said confirmation call before said scheduled telephone call becomes due.

25. The system of claim 23, wherein said service control point (SCP) and said service node (SN) are adapted to place said confirmation call at a substantially same time as said scheduled telephone call becomes due.

26. The system of claim 23, wherein said service control point (SCP) and said service node (SN) are adapted to place said confirmation call after said scheduled telephone call becomes due.

27. The system of claim 23, wherein said service switching point (SSP) is adapted to connect said scheduling party with said party to be called, after said scheduling party acknowledges said confirmation call.

28. The system of claim 11, wherein said service node (SN) is adapted to place said confirmation call to said alternate telephone station substantially contemporaneously with said confirmation call to said first telephone station.

29. The system of claim 11, wherein said service node (SN) is adapted to place said confirmation call to said alternate telephone station before placing said confirmation call to said first telephone station.

30. The system of claim 29, wherein said service node (SN) is adapted to place said confirmation call to said first telephone station if there is no answer at said alternate telephone station.

31. A method for scheduling an outgoing telephone call, the method comprising
 determining at a service switching point (SSP) whether an outgoing call has been scheduled;
 receiving call scheduling information from a telephone interface to the SSP;
 if an outgoing call has not been scheduled, waiting for data representing a scheduled outgoing call;
 receiving a call schedule service identifier (CSSI) by the SSP, once an outgoing call has been scheduled;
 transferring the CSSI from the SSP to a service control point (SCP) service package application (SPA);
 verifying that the submitted scheduled outgoing call is being submitted by a telephone interface authorized to schedule calls;
 accepting information by the SSP from telephone interface indicative of outgoing calls to be scheduled, wherein the call schedule information includes at least one of: a time and date of the scheduled call, at least one number to be called at the time and date, and a confirmation number to call prior to placing the scheduled call, wherein the confirmation number is specified by a scheduling party.

* * * * *